United States Patent Office 2,841,576
Patented July 1, 1958

2,841,576

COMPLEX METAL COMPOUNDS OF AZO-DYESTUFFS

Christian Zickendraht, Binningen, and Arthur Buehler, Rheinfelden, Switzerland, assignors to Ciba Limited, Basel, Switzerland, a Swiss firm No Drawing. Application April 16, 1956
Serial No. 578,164

Claims priority, application Switzerland April 21, 1955

12 Claims. (Cl. 260—145)

This invention provides, as new products, conversion products of complex metal compounds of azo-dyestuffs, which contain a basic dyestuff and a complex metal compound of an azo-dyestuff which is free from carboxylic acid groups not present in a position vicinal to an azo linkage and from sulfonic acid groups, and contains a sulfone group or a sulfonic acid amide group.

The invention also provides a process for the manufacture of the aforesaid conversion products, wherein a complex metal compound of a monoazo-dyestuff, which is free from carboxylic acid groups not present in a position vicinal to an azo linkage and from sulfonic acid groups, and contains a sulfone group or a sulfonic acid amide group, is reacted with a basic dyestuff.

The complex metal compounds of azo-dyestuffs, which are free from carboxylic acid groups not present in a position vicinal to an azo linkage and from sulfonic acid groups, and contain a sulfone group or a sulfonic acid amide group, used as starting materials, and which complex metal compounds may contain, for example, aluminum or a metal having an atomic number of 24 to 29, such as nickel or copper, or especially cobalt or chromium, and if desired two or more of these metals, are obtainable by methods in themselves known by treating the metal-free dyestuff with an agent yielding metal, for example, in an acid, neutral or alkaline medium, under atmospheric or superatmospheric pressure, and if desired in the presence of a suitable addition that increases the solubility or assists the formation of the complex. Especially suitable are metalliferous monoazo-dyestuffs obtained by treating with an agent yielding metal, advantageously an agent yielding chromium or cobalt, an ortho-carboxy-ortho'-hydroxy-monoazo-dyestuff or an ortho-hydroxy-ortho'-amino-monoazo-dyestuff, and especially an ortho:ortho'-dihydroxy-monoazo-dyestuff, in such manner that the resulting complex metal compound contains less than one or advantageously about ½ an atomic proportion of metal per molecular proportion of monoazo-dyestuff. Such complex metal compounds, of which some are known, can be prepared, for example, by reacting in approximately the molecular ratio 1:1:1 an agent yielding metal with two monoazo-dyestuffs free from carboxylic acid groups not in a position vicinal to the azo linkage and from sulfonic acid groups, and at least one of which dyestuffs contains a sulfone group or a sulfonic acid amide group. These two monoazo-dyestuffs may be identical or different from one another. One of the dyestuffs and preferably both of them must contain a sulfone group, for example, a methyl-, ethyl- or phenyl-sulfone group, or a substituted or unsubstituted sulfonic acid amide group. A large number of monoazo-dyestuffs having the aforesaid constitution are known. They can be prepared by methods in themselves known by coupling an ortho-carboxy-diazo-compound or ortho-hydroxy-diazo-compound of the benzene series containing a sulfonic acid amide group or a sulfone group with a compound capable of coupling in a position vicinal to an aromatically bound amino- or hydroxyl group (that is to say an aromatically bound hydroxyl group or an enolisable or enolized keto group). The treatment with the agent yielding metal is advantageously carried out in a weakly acid to alkaline medium. Accordingly, there are advantageously used as agents yielding metal those which are stable in an alkaline medium such, for example, as metal compounds, especially cobalt or chromium compounds, of aliphatic hydroxy-carboxylic acids or dicarboxylic acids and chromium compounds of aromatic ortho-hydroxy-carboxylic acids, which compounds contain the metal in complex union. As examples of aliphatic hydroxy-carboxylic acids and dicarboxylic acids there may be mentioned, inter alia, oxalic acid, lactic acid, glycollic acid, citric acid and especially tartaric acid, and among the aromatic ortho-hydroxy-carboxylic acids there may be mentioned, for example, those of the benzene series such as 4-, 5- or 6-methyl-1-hydroxybenzene-2-carboxylic acid and especially 1-hydroxybenzene-2-carboxylic acid itself. As agents yielding cobalt there may also be used simple compounds of divalent cobalt, such as cobalt sulfate or cobalt acetate.

Processes for making the metal compounds used as starting materials in the present process are described, for example, in U. S. Patents Nos. 2,565,898, 2,673,199, 2,784,179, 2,778,816, 2,727,032, 2,776,956 and 2,551,056.

As basic dyestuffs there may be used dyestuffs of the aryl-methane, azo, thiazine, azine or oxazine series. There are advantageously used basic dyestuffs which are free from sulfonic acid groups. As dyestuffs of the aryl-methane series there may be mentioned more especially those of the di- or tri-aryl-methane series which contain at least two substituted amino groups, and preferably those of the xanthone series which contain the amino groups in para-position to the central carbon atom.

The reaction of the complex metal compounds of azo-dyestuffs of the kind defined above with the basic dyestuffs may be carried out at room temperature or at a raised temperature, if desired, in the presence of an organic solvent. Advantageously, one or more of these basic dyestuffs or salts thereof are added to an aqueous solution of the complex metal compound, whereby the resulting conversion product precipitates in an easily filterable form and can be isolated. The reaction can be carried out with dyestuff solutions of various pH values, but advantageously those having a pH value within the range of 5.5 to 9.5. In many cases it is possible to use directly for the reaction a reaction mixture resulting from the conversion of the metal-free dyestuff into its complex metal compound.

The conversion products of this invention can also be obtained by metallizing the dyestuffs containing a sulfone or sulfonic acid amide group in the presence of the basic dyestuffs.

The conversion products of this invention are new.

They are conversion products (salts) of basic dyestuffs with complex metal compounds of azo-dyestuffs, which are free from carboxylic acid groups not present in a position vicinal to an azo linkage and from sulfonic acid groups, and contain a sulfone group or a sulfonic acid amide group. The conversion products are well defined crystalline substances.

They are soluble in organic solvents such as esters, acetone and especially alcohol. They are suitable for dyeing natural or artificial resins, waxes, lacquers and plastic masses, for example, of cellulose ethers or esters, for example, for dye-spinning cellulose acetate artificial silk, and for dyeing natural or synthetic polymers such as superpolyamides and superpolyurethanes and also for printing various materials for example paper. The dyeings produced with the conversion products of this invention are distinguished by their very good fastness to light.

The following examples illustrate the invention, the parts and percentages being by weight:

Example 1

37.6 parts of the dyestuff from diazotized 2-amino-1-hydroxybenzene-4-sulfonic acid amide and acetoacetic acid anilide are dissolved in 500 parts of water at 80° C. with the addition of 27 parts of sodium hydroxide solution of 30 percent strength. After the addition of 250 parts of a solution of cobalt sulfate having a cobalt content of 1.18 percent, the whole is stirred for 30 minutes at 80–85° C. At the end of this period the formation of the complex compound is complete. After cooling the mixture to 40° C., a solution of 30 parts of the dyestuff of the formula

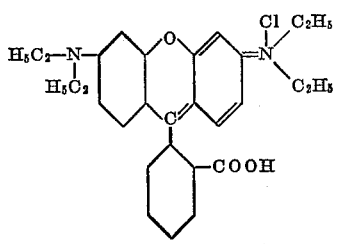

in 500 parts of water and 10 parts of acetic acid of 85 percent strength are run in. After stirring the mixture for about one hour, the completely precipitated conversion product is filtered off, and, if desired, washed with water. When dry it is a red powder which dissolves in sulfuric acid with a yellow coloration and in alcohol with an orange coloration. A solution of the product in nitrocellulose lacquer when applied to a suitable support yields yellowish red coatings.

Example 2

37.3 parts of the dyestuff from diazotized 2-amino-1-hydroxybenzene-4-sulfonic acid amide and 1-phenyl-3-methyl-5-pyrazolone are dissolved in 500 parts of water and 27 parts of sodium hydroxide solution of 30 percent strength. The solution is heated to about 80° C., and 250 parts of a cobalt sulfate solution having a cobalt content of 1.18 percent are added, and the whole is stirred for about 30 hours at 80–85° C. By the addition of acetic acid the solution is rendered neutral to phenolphthalein and then cooled to 40° C. A solution of 30 parts of the dyestuff of the formula

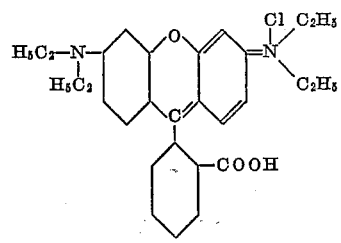

in 450 parts of water and 10 parts of acetic acid of 85 percent strength are slowly run in, whereby the dyestuff salt precipitates almost completely. After prolonged stirring of the mixture, the dyestuff is filtered off and washed with water. When dry it is a red powder which dissolves in concentrated sulfuric acid with a yellow coloration and in alcohol with an orange coloration. Nitrocellulose lacquers containing this product yield coatings having full yellowish red tints.

Products yielding very similar shades are obtained by using, instead of 2-amino-1-hydroxy-benzene-4-sulfonic acid amide, 2-amino-1-hydroxybenzene-4-methyl sulfone or 2-amino-1-hydroxybenzene-4-ethyl sulfone, and otherwise proceeding in exactly the same manner.

Example 3

40.7 parts of the dyestuff from diazotized 4-chloro-2-amino-1-hydroxybenzene-5-sulfonic acid amide and 1-phenyl-3-methyl-5-pyrazolone are stirred in 300 parts of water, and 120 parts of a solution of sodium chromosalicylate having a chromium content of 2.6 percent and also 6.7 parts of sodium hydroxide solution of 30 percent strength are added. After boiling the mixture for several hours under reflux, the chromium complex is precipitated by the addition of sodium chloride and neutralization with acetic acid and then filtered off.

The paste so obtained is dissolved in 450 parts of water at 70° C. After cooling the solution to 40° C., a solution of 30 parts of the dyestuff of the formula

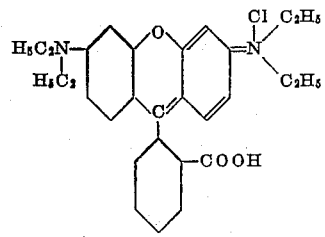

in 500 parts of water and 10 parts of acetic acid of 85 percent strength is run in. The resulting dyestuff salt precipitates completely. It is filtered off and washed with water. When dry it is a red powder which dissolves in concentrated sulfuric acid with a yellow coloration and in alcohol with an orange coloration. Nitrocellulose lacquers containing this product yield full bluish red coatings.

In the following table are given similar dyestuffs, which dye lacquer coatings the tints given in column 4. These dyestuffs are obtained by the methods described in the preceding examples by reacting the monoazo-dyestuff mentioned in column 1 with the corresponding agent yielding the metal mentioned in column 2, and precipitating the metal complex formed with a solution of the dyestuff given in column 3:

| | 1 | 2 | 3 | 4 |
|---|---|---|---|---|
| 1 | 2-hydroxy-5-sulfamoylphenyl azo acetoacetanilide derivative | Co | bis[4-(dimethylamino)phenyl][4-(phenylamino)naphthalen-1-yl]methylium chloride | green. |
| 2 | 4-amino-6-chloro-2-hydroxy-5-sulfamoylphenyl azo 1,4-dichloro-2-hydroxynaphthalene | Cr | bis[4-(dimethylamino)phenyl][4-(phenylamino)naphthalen-1-yl]methylium chloride | blue. |
| 3 | 2-hydroxy-5-(N-methylsulfamoyl)phenyl azo acetoacetanilide derivative | Co | bis[4-(methylamino)-2-methylphenyl]methylium chloride (iminium form) | yellow. |
| 4 | 2-hydroxy-5-sulfamoylphenyl azo 3-methyl-1-phenyl-5-pyrazolone | Ni | bis[4-(dimethylamino)phenyl][4-(phenylamino)naphthalen-1-yl]methylium chloride | bluish green. |
| 5 | 2-hydroxy-3-nitro-5-methylsulfonylphenyl azo 2-aminonaphthalene | Co | bis[4-(methylamino)-2-methylphenyl]methylium chloride | yellowish green. |
| 6 | 2-carboxy-4-sulfamoylphenyl azo 3-methyl-1-phenyl-5-pyrazolone | Cr | bis[4-(dimethylamino)phenyl][4-(phenylamino)naphthalen-1-yl]methylium chloride | green. |

| | 1 | 2 | 3 | 4 |
|---|---|---|---|---|
| 7 | 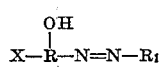 | Co | 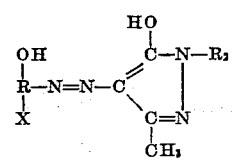 | reddish violet. |
| 8 | 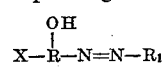 | Cr | 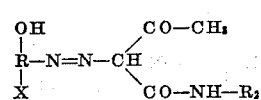 | bluish red. |

What is claimed is:

1. A reaction product of a triarylmethane dyestuff having a xanthone ring but being free from sulfonic acid groups with a complex metal compound containing one atom of one of the metals selected from the group consisting of cobalt and chromium bound in complex union with substantially two molecules of a monoazo dyestuff free from sulfonic and carboxylic acid groups and corresponding to the formula $$\overset{OH}{\underset{}{X-R-N=N-R_1}}$$

wherein X represents a member selected from the group consisting of a sulfone group and a sulfonic acid amide group, R represents a benzene radical bound to the azo linkage in vicinal position to the hydroxy group and $R_1$ represents the radical of an enolic coupling component bound to the azo linkage in a position vicinal to the enolized keto group.

2. A reaction product of a triphenylmethane dyestuff having a xanthone ring but being free from sulfonic acid groups and containing at least two amino groups in the p-positions to the central carbon atom, with a complex chromium compound containing one atom of chromium bound in complex union with substantially two molecules of a monoazo dyestuff free from sulfonic and carboxylic acid groups and corresponding to the formula $$\overset{OH}{\underset{}{X-R-N=N-R_1}}$$

wherein X represents a member selected from the group consisting of a sulfone group and a sulfonic acid amide group, R represents a benzene radical bound to the azo linkage in vicinal position to the hydroxy group and $R_1$ represents the radical of a 5-pyrazolone bound to the azo linkage in 4-position.

3. A recation product of a triphenylmethane dyestuff having a xanthone ring but being free from sulfonic acid groups and containing at least two amino groups in the p-positions to the central carbon atom, with a complex cobalt compound containing one atom of cobalt bound in complex union with substantially two molecules of a monoazo dyestuff free from sulfonic and carboxylic acid groups and corresponding to the formula $$\overset{OH}{\underset{}{X-R-N=N-R_1}}$$

wherein X represents a member selected from the group consisting of a sulfone group and a sulfonic acid amide group, R represents a benzene radical bound to the azo linkage in vicinal position to the hydroxy group and $R_1$ represents the radical of a β-ketocarboxylic acid-arylide bound to the azo linkage in α-position.

4. A reaction product of a triphenylmethane dyestuff free from sulfonic acid groups and containing a xanthone ring and two amino groups each in para-position to the central carbon atom, with a complex chromium compound containing one atom of chromium bound in complex union with substantially two molecules of a monoazo dyestuff free from sulfonic and carboxylic acid groups and corresponding to the formula

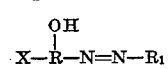

wherein X represents a sulfonic acid amide group, R and $R_2$ each represent a benzene radical, R being bound to the azo linkage in vicinal position to the hydroxy group.

5. A reaction product of a triphenyl-methane dyestuff free from sulfonic acid groups and containing a xanthone ring and two amino groups each in para-position to the central carbon atom, with a complex cobalt compound containing one atom of cobalt bound in complex union with substantially two molecules of a monoazo dyestuff free from sulfonic and carboxylic acid groups and corresponding to the formula $$\overset{OH}{\underset{X}{R-N=N-CH}}\overset{CO-CH_3}{\underset{CO-NH-R_2}{}}$$

wherein X represents a sulfonic acid amide group, R and $R_2$ each represents a benzene radical, R being bound to the azo linkage in vicinal position to the hydroxy group.

6. A reaction product of the dyestuff of the formula

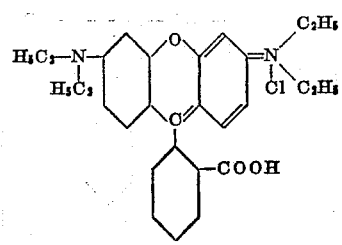

with a complex chromium compound containing one atom of chromium bound in complex union with substantially two molecules of a monoazo dyestuff free from sulfonic and carboxylic acid groups and corresponding to the formula

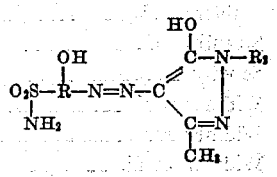

wherein R and $R_2$ each represents a benzene radical, R being bound to the azo linkage in ortho-position to the azo linkage.

7. A reaction product of the dyestuff of the formula

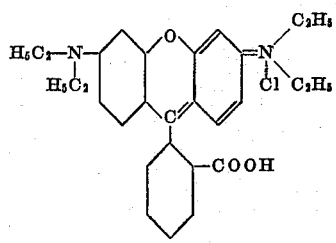

with a complex cobalt compound containing one atom of cobalt bound in complex union with substantially two molecules of monoazo dyestuff free from sulfonic and carboxylic acid groups and corresponding to the formula

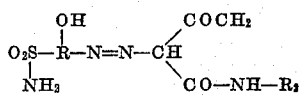

wherein R and $R_2$ each represents a benzene radical, R being bound to the azo linkage in ortho-position to the azo linkage.

8. A reaction product of the dyestuff of the formula

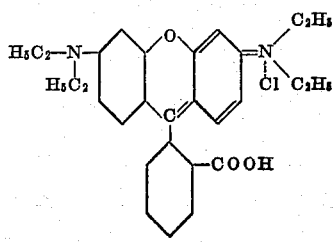

with a complex chromium compound containing one atom of chromium bound in complex union with substantially two molecules of a monoazo dyestuff free from sulfonic and carboxylic acid groups and corresponding to the formula

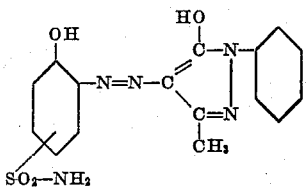

9. A reaction product of the dyestuff of the formula

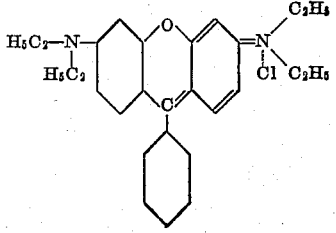

with a complex cobalt compound containing one atom of cobalt bound in complex union with substantially two molecules of a monoazo dyestuff free from sulfonic and carboxylic acid groups and corresponding to the formula

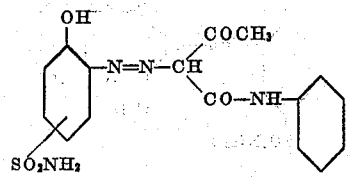

10. The reaction product of the dyestuff of the formula

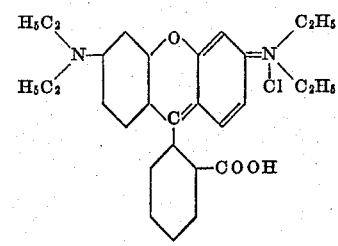

with the complex chromium compound containing one atom of chromium bound in complex union with substantially two molecules of the monoazo dyestuff of the formula

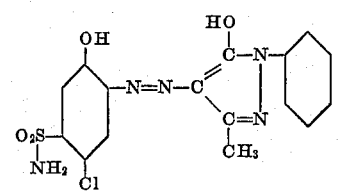

11. The reaction product of the dyestuff of the formula

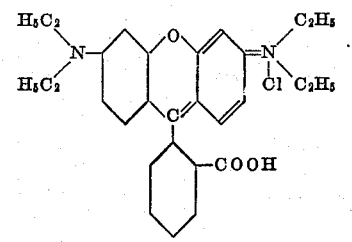

with the complex cobalt compound containing one atom of cobalt bound in complex union with substantially two molecules of the monoazo dyestuff of the formula

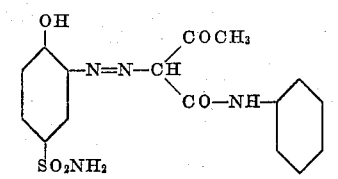

12. The reaction product of the dyestuff of the formula

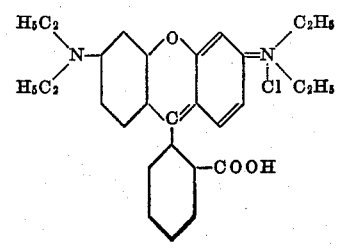

with the complex chromium compound containing one atom of chromium bound in complex union with substantially two molecules of the monoazo dyestuff of the formula
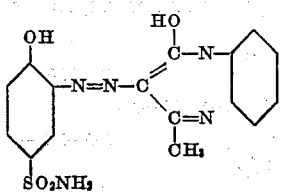
References Cited in the file of this patent
UNITED STATES PATENTS
| | | |
|---|---|---|
| 1,623,005 | Gubler et al. | Mar. 29, 1927 |
| 2,104,357 | Straub et al. | Jan. 4, 1938 |
| 2,551,056 | Schetty | May 1, 1951 |
| 2,565,898 | Widmer et al. | Aug. 28, 1951 |
| 2,673,199 | Widmer et al. | Mar. 23, 1954 |
| 2,674,515 | Widmer et al. | Apr. 6, 1954 |
| 2,727,032 | Buehler et al. | Dec. 13, 1955 |

UNITED STATES PATENT OFFICE
Certificate of Correction

Patent No. 2,841,576                                                                       July 1, 1958

Christian Zickendraht et al.

It is hereby certified that error appears in the printed specification of the above numbered patent requiring correction and that the said Letters Patent should read as corrected below.

Column 9, lines 72 to 75, the lower portion of the formula should appear as shown below instead of as in the patent—

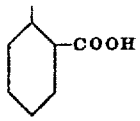

column 11, lines 5 to 11, the right-hand portion of the formula should appear as shown below instead of as in the patent—

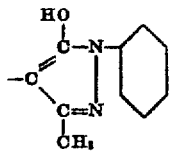

Signed and sealed this 24th day of February 1959.

[SEAL]

Attest:
KARL H. AXLINE,
*Attesting Officer.*

ROBERT C. WATSON,
*Commissioner of Patents.*